(12) United States Patent
Chan et al.

(10) Patent No.: US 8,400,076 B2
(45) Date of Patent: Mar. 19, 2013

(54) CURRENT LEAKAGE PROTECTION DEVICE FOR LED APPLICATIONS

(75) Inventors: Cho Sing Chan, Hong Kong (CN); Ming Tai Ho, Hong Kong (CN)

(73) Assignee: Century Concept Ltd., Hong Kong (CN)

( * ) Notice: Subject to any disclaimer, the term of this patent is extended or adjusted under 35 U.S.C. 154(b) by 174 days.

(21) Appl. No.: 12/899,561

(22) Filed: Oct. 7, 2010

(65) Prior Publication Data

US 2012/0086356 A1    Apr. 12, 2012

(51) Int. Cl.
 *H05B 37/02* (2006.01)
(52) U.S. Cl. .................. 315/294; 315/297; 315/307
(58) Field of Classification Search .............. 315/185 R, 315/209 R, 210, 291, 294, 297, 307, 308
See application file for complete search history.

(56) References Cited

U.S. PATENT DOCUMENTS

| | | | |
|---|---|---|---|
| 2008/0218100 A1* | 9/2008 | Parikh | 315/306 |
| 2009/0184668 A1* | 7/2009 | Mednik et al. | 315/297 |
| 2010/0213858 A1* | 8/2010 | Kuroki et al. | 315/210 |
| 2010/0259177 A1* | 10/2010 | Mednik et al. | 315/185 R |

* cited by examiner

*Primary Examiner* — Tung X Le
(74) *Attorney, Agent, or Firm* — Muncy, Geissler, Olds & Lowe, PLLC

(57) ABSTRACT

An electronic circuit for driving an LED device, including an LED, a driver for supply current to the LED array, and one or two current detection modules connected to one or both ends of the LED array for detecting current level and sending signals about the current level detected to the driver, which will break the circuit immediately upon detecting a fault condition on either side of the LED array based on the feedback from one or both current detection modules.

12 Claims, 5 Drawing Sheets

CURRENT LEAKAGE PROTECTION DEVICE FOR LED APPLICATIONS

FILED OF THE INVENTION

This invention relates to a current leakage protection device or circuit breaker. More particularly, it relates to a current leakage protection device or circuit breaker for LED applications.

BACKGROUND OF THE INVENTION

LED lighting engines have become ever popular in recent years. It not only offers a longer life span, but also operates with lower power consumption that results in energy saving and thus is more environmental-friendly. LED can find applications in many areas including, for example, general lighting, decorative lighting both indoors and outdoors, security systems, and replacement of existing light sources such as the fluorescent lamps and halogen lamps.

More and more researches have been done to increase LED brightness at the same power level (lm/W), and many driving schemes have been proposed. However, relatively less attention has been paid to safety aspect of the LED applications. Practically, other than the existing generally applicable safety approval tests, which necessarily require sophisticated integrated controller and/or sensing modules or components, there is no safety tests or measures designed specifically for LED appliances which are simple and yet provide guarantee that the LED product would not injure users under any conditions, especially when the LED product is intended to replace the ones used in existing infrastructures. A good example can be found where LED tubes (array) are used to replacing fluorescent tubes. There is a need for developing a new current leakage protection device specific for LED applications.

SUMMARY OF THE INVENTION

According to one aspect of the present invention, there is provided an electronic circuit including (a) an LED array having two ends and including at least one LED; (b) a driver for supplying current to said LED array; (c) a first current detection module connected to one of said two ends for detecting current level and sending a signal based on said current level detected to said driver.

According to one embodiment, the driver includes a logic block which stops power supply upon a certain signal received from said first current detection module.

According to one embodiment, the electronic circuit further includes a second current detection module connect to the other end of said two ends, said second current detection module is capable of detecting current level and sending a signal based on said current level detected to said driver.

According to one embodiment, the driver decides whether to stop power supply based on signals received from said first current detection module and said second current detection module, respectively.

In one embodiment, the electronic circuit is of a buck topology.

In one embodiment, the electronic circuit is of a flyback topology.

In one embodiment, the electronic circuit is of a forward converter topology.

In one embodiment, the driver is of a switching type.

In one embodiment, the driver is of a non-switching type.

In one embodiment, the driver is a linear driver.

In one embodiment, the LED array is isolated from the mains.

In one embodiment, the LED array is non-isolated from the mains.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

DETAILED DESCRIPTION OF PARTICULAR EMBODIMENTS OF THE INVENTION

Figure 1:
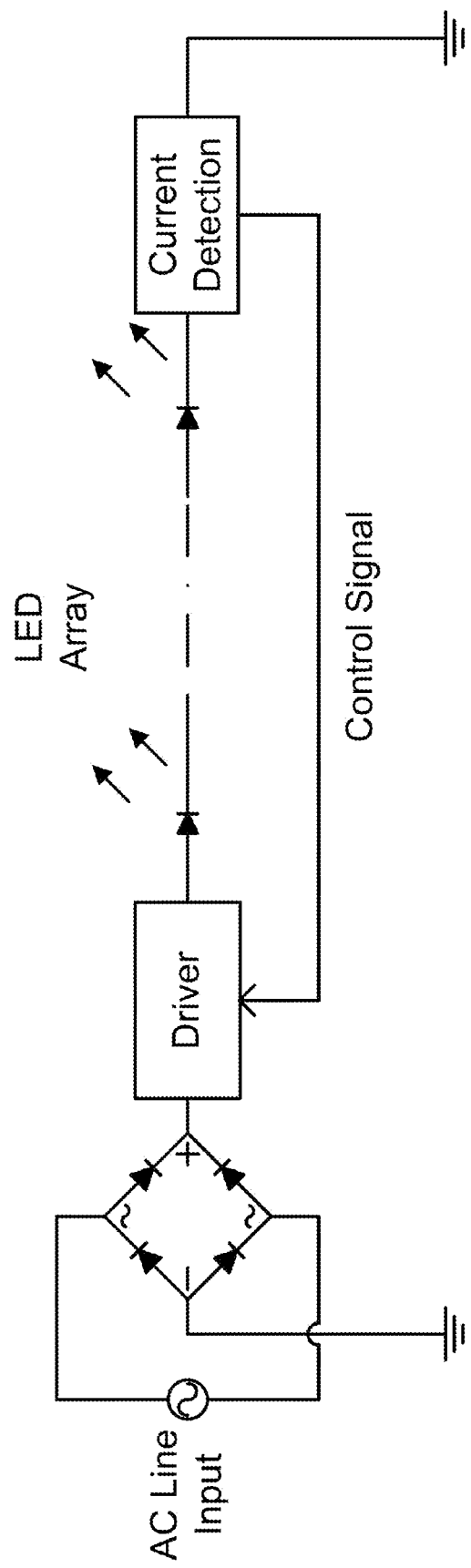
FIG. 1 depicts a general structure of an LED array protected with a circuit breaker of the present invention which has one-point current detection scheme.

FIG. 1 depicts a general structure of an LED array protected with a circuit breaker of the present invention. The circuit breaker comprises a current detection component and a driver. In this example, the AC input voltage is converted to DC by the bridge rectifier, followed by a driver circuit. The driver delivers power to the LED array, usually employing a constant-current scheme. The current going through the LEDs are controlled by receiving the control signal from the current detection component/module, which continuously monitors the LED current and is usually located in series with the LED array. If the driver determines that the system is under fault condition based on the signal from the current detection module, it will stop the power delivery and break the circuit. The driver and the current detection component or module are conventional and known to people skilled in the art, and it is within ordinary skill in the art to select suitable driver and current detection module to suit a particular application of the present invention.

Figure 2:
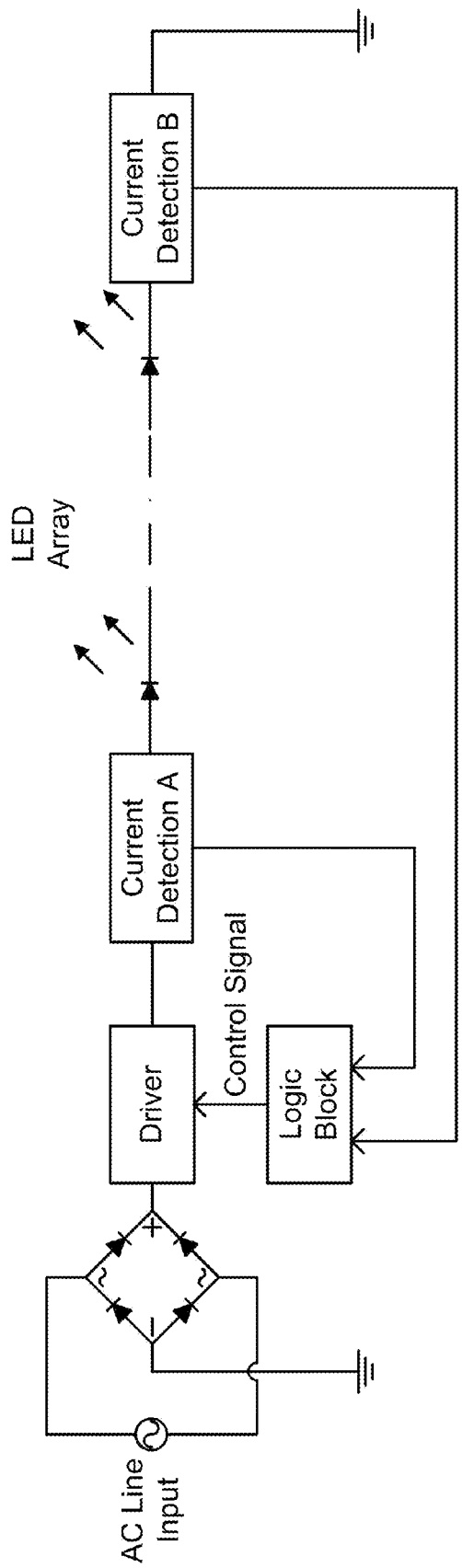
FIG. 2 depicts a circuit breaker of the present invention which has two-point current detection scheme.

FIG. 2 shows another embodiment of the present invention where the circuit breaker uses a two-point current detection scheme. In some real life situations, for example, when replacing a LED tube, the embodiment shown in FIG. 1 may not be adequate, because it only detects the fault condition at one point of the array but the user replacing the tube may touch either end of the tube. If the fault occurs at the other end of the array, the driver may not be aware of the situation and will continue the power supply, causing damages to the circuit and/or the user. Therefore, this embodiment of the present invention featuring a two-point current detection scheme is designed to overcome the difficulties under the situations such as the above mentioned. Two current detection modules, of the same or different form or circuit structure, are used at both ends of the LED array. The logic block within the driver receives the signals from both detection modules, and permits power supply only when both detectors return signals reflecting normal operating conditions. This ensures that the power supply will not continue when either side of the LED array is in fault condition to protect the LED device and the user. Again, the driver and the current detection component or module are conventional and known to people skilled in the art, and it is within ordinary skill in the art to select suitable driver and current detection modules to suit a particular application of the present invention.

Figure 3:
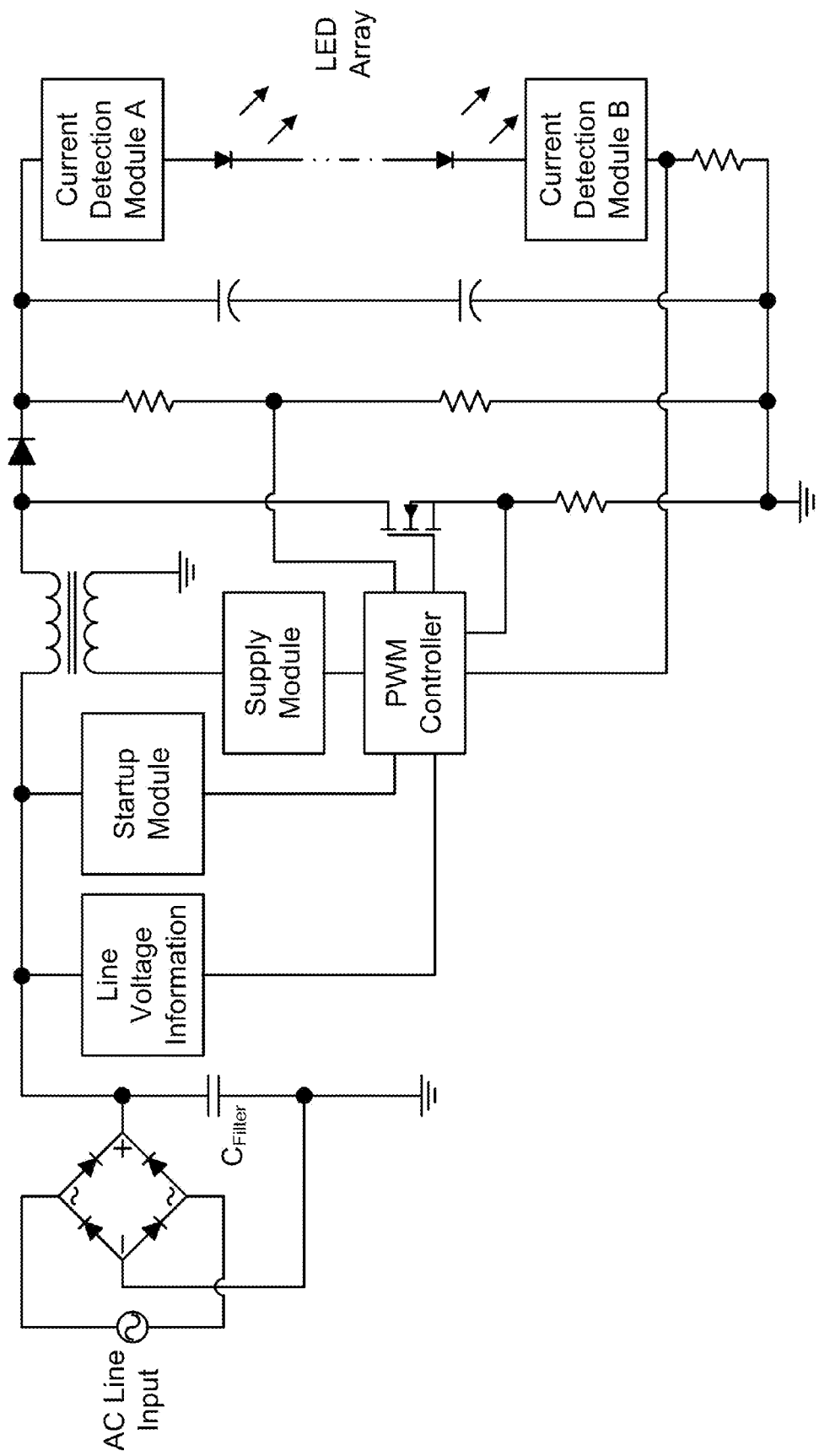
FIG. 3 depicts an exemplary step-up (boost) circuit topology driving an LED array which employs a circuit breaker of the present invention with two-point current detection scheme.

FIG. 3 is a typical step-up (boost) circuitry for driving an LED array, which employs two-point current detection circuit breaker of the present invention as a safety measure. This circuit topology can be widely used in situations where the LED array contains such a larger number of LEDs connected in series that the overall forward voltage is higher than the input voltage. Thus, the input voltage must be boosted to a higher voltage in order to ignite the LEDs. The LED current is sensed and fed back to the PWM (Pulse Width Modulation) controller so as to keep it constant. The PWM controller also receives the information from the line voltage to achieve power factor correction. Current detection modules A and B monitor the current going in and going out of the LED array, feeding the current information back to the PWM controller which, upon sensing a fault condition, instantly ceases power transfer, that is, cuts off the power supply to the circuit. In this case, the PWM includes the logic block for functioning as the circuit breaker of the present invention.

Figure 4:
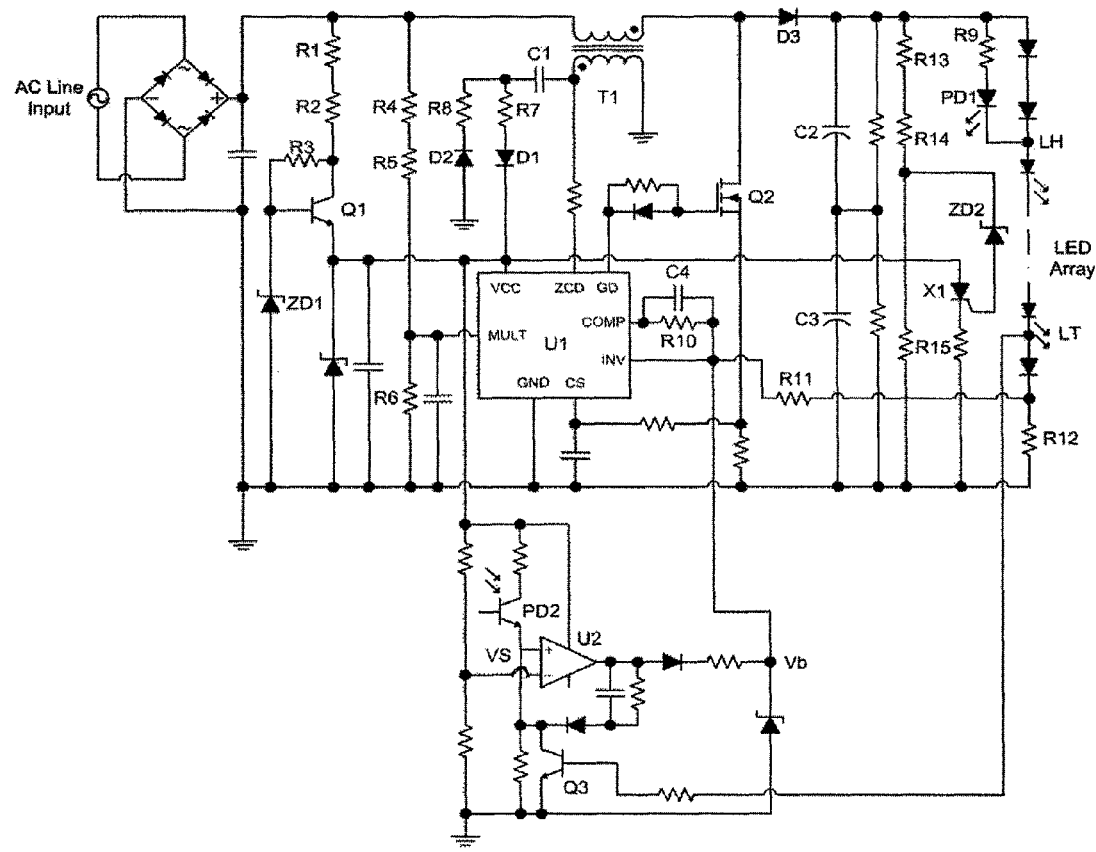
FIG. 4 depicts a circuit having a circuit breaker of the present invention for use in a fluorescent tube replacement by an LED array.

FIG. 4 depicts an actual embodiment of the present invention as used in an LED array as a fluorescent tube replacement. The LED array contains 140 LEDs, and has a typical total forward voltage of 460V. The points "LH" and "LT" are points where users may touch in real life, and where a leakage current will likely occur and cause injuries to the users. The PWM controller U1 is a common active power factor correction (APFC) IC such as the ST L6562, which is commonly available in the market. The boost circuit is formed by components T1, Q2 and D3. T1 is an inductor. Q2 is an N-Channel MOSFET and D3 is an ultrafast-recovery diode or a silicon carbide diode. All these components or their equivalents and substitutes can be easily purchased off-the-shelf. Q2 is turned on and off (switching) by the APFC IC U1. The AC input voltage is converted to a fairly constant DC voltage, and maintained by capacitors C2 and C3.

When the output voltage on C2 and C3 is larger than the total forward voltage of the LED array, the LEDs will be lit. Due to the characteristic of the LEDs, this voltage will be held fairly constant. The current flowing through the LEDs is monitored by resistor R12, and regulated with the feedback network resistors R10, R11 and capacitor C4 by the APFC IC U1. In this example, the LED current is kept at 50 mA. Resistors R1, R2, R3, NPN transistor Q1, and zener diode ZD1 form a startup module to facilitate the starting of the circuit by providing energy to voltage VCC of the APFC IC U1. Afterwards, the APFC IC U1 is supplied by the supply module, formed by resistors R7, R8, diodes D1, D2 and capacitor C1. In this example, the VCC voltage of the APFC IC U1 is kept fairly constant at 15V. Resistors R4, R5, R6 provide the necessary line voltage information to the APFC IC U1 for active power factor correction operation.

The first current detection module is formed by resistor R9, PD1 and PD2. PD1 and PD2 are part of an opto-coupler. In this example the opto-coupler is a PC817. If leakage occurs at point "LH", current will flow through PD1 and thus turning PD2 on. The NPN transistor Q3, which is an MMBT2222A in this example, will be turned on if the current is properly flowing through the LEDs and also R12. If the leakage occurs at point "LT", Q3 will be switched off. Therefore PD1-PD2-Q3 form a logically "AND" circuit to ensure that the voltage at point "VS" is low only when leakages do not occur at both detection points. U2 is a comparator IC, which is a TS321 in this example, that in case of fault conditions, its output voltage will be logically high, and thus the voltage Vb will be greater than 2.5V. When the voltage Vb is greater than 2.5V, the APFC IC U1 is inhibited and no further energy will be transferred from the input to the LED side.

In case that if any of the LEDs becomes open-circuit, the output voltage cannot be automatically kept constant and will go up continuously. In order not to cause injuries to the user, the output voltage is monitored by resistors R13, R14 and R15. If it exceeds a predefined value, which is 500V in this example, the zener diode ZD2 will cause thyristor X1 to trigger, and cause the VCC voltage the APFC IC U1 to become zero. This will stop the APFC IC U1 from working. The circuit remains broken as long as the output voltage is above the predefined value.

Figure 5:
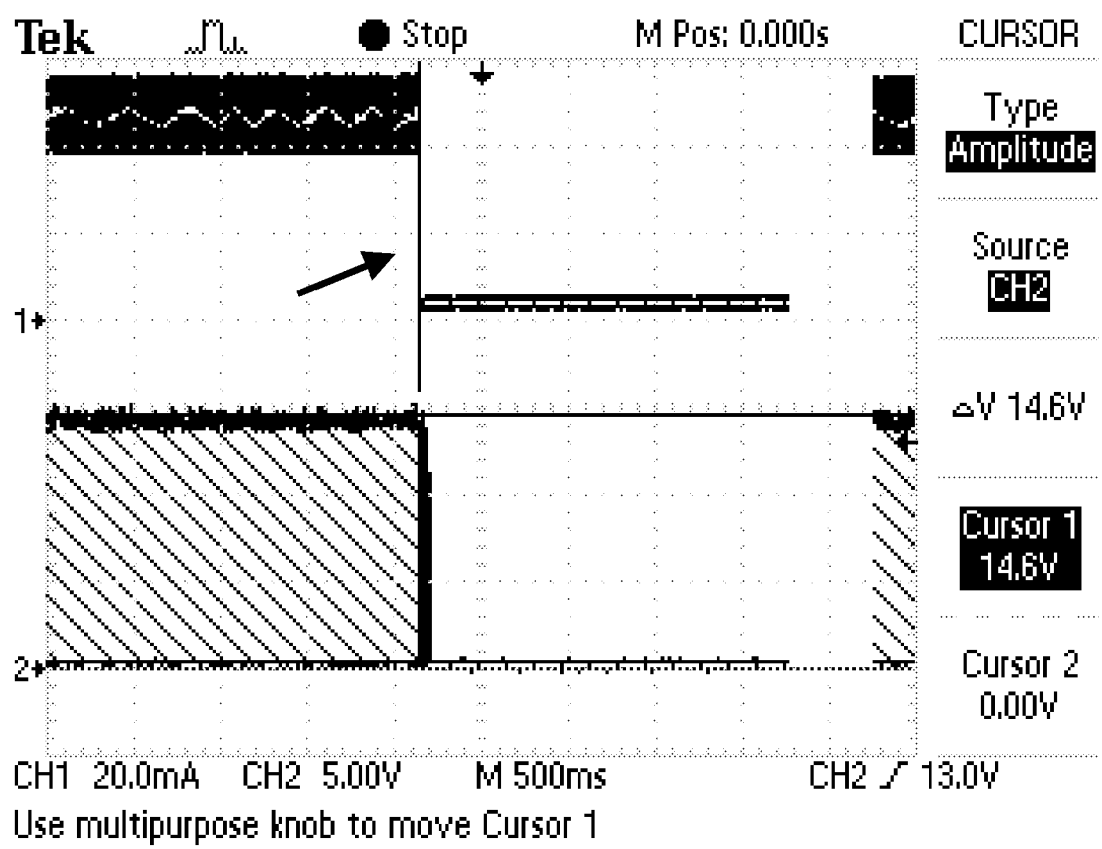
FIG. 5 depicts a waveform showing the triggering of protection when leakage occurs. Ch1 is LED current. Ch2 is the VCC voltage of the APFC IC U1.

FIG. 5 depicts a waveform that shows the triggering of protection upon the occurrence of leakage. Prior to the leakage, the LED current (Ch1) is kept fairly constant at 50 mA, whereas the VCC voltage of the APFC IC U1 is kept fairly at 15V (Ch2). The leakage was simulated by connecting a 500 ohm resistor to the point "LH" when the circuit is in operation, as guided by test procedures according to the standards for safety, such as the UL 935. After the leakage, the LED current and the VCC voltage of the APFC IC U1 both become zero. The power transfer stops immediately.

It is understood by people with ordinary skill in the art that the circuit protection device as embodied in the foregoing is applicable to other circuit topologies such as the buck, flyback, forward converters, etc. It is applicable whether or not the LED array is isolated or non-isolated to the mains. Furthermore, the driver is not necessarily a switching type, and other types, such a linear driver, are capable of employing this protection circuit breaker.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. An electronic circuit, comprising:
    (a) an LED array having two ends and comprising at least one LED;
    (b) a driver for supplying current to said LED array;
    (c) a first current detection module connected to one of said two ends for detecting current level and sending a signal based on said current level detected to said driver;
    (d) a second current detection module connected to one of said two ends for detecting current level and sending a signal based on said current level detected to said driver; and
    (e) logic circuits in said driver that determine an occurrence of a current leakage condition and stop power supply to said LED array based on said signals from said first current detection module and said second current detection module.

2. The electronic circuit of claim 1, wherein said driver is of a switching type.

3. The electronic circuit of claim 2, wherein said driver is of a buck topology.

4. The electronic circuit of claim 2, wherein said driver is of a flyback topology.

5. The electronic circuit of claim 2, wherein said driver is of a forward topology.

6. The electronic circuit of claim 1, wherein said driver is of a non-switching type.

7. The electronic circuit of claim 6, wherein said driver is a linear driver.

8. The electronic circuit of claim 1, wherein said LED array is isolated from the mains.

9. The electronic circuit of claim 1, wherein said LED array is non-isolated from the mains.

10. The electronic circuit of claim 1, wherein the logic circuits permit power supply only when both of the first current detection module and the second current detection module return signals reflecting normal operating conditions.

11. The electronic circuit of claim 1, wherein the first current detection module and the second current detection module detect a current of the LED array.

12. The electronic circuit of claim 1, wherein the first detection module directly contacts the one of said two ends of the LED array.

* * * * *